United States Patent [19]

Cunningham

[11] 4,060,924
[45] Dec. 6, 1977

[54] FISHING POLE EYE

[76] Inventor: Leroy G. Cunningham, 1515 S. 118th E. Ave., Tulsa, Okla. 74128

[21] Appl. No.: 686,749

[22] Filed: May 17, 1976

[51] Int. Cl.² ............................................. A01K 87/04
[52] U.S. Cl. ......................................................... 43/24
[58] Field of Search .............................................. 43/24

[56] References Cited

U.S. PATENT DOCUMENTS

| 801,884 | 10/1905 | Kunze et al. | 43/24 |
| 839,104 | 12/1906 | Buschemeyer | 43/24 |
| 2,573,647 | 10/1951 | Marke | 43/24 |
| 3,417,501 | 12/1968 | Fulop | 43/24 |

*Primary Examiner*—Warner H. Camp
*Attorney, Agent, or Firm*—Head, Johnson & Chafin

[57] ABSTRACT

An eye for a fishing pole has a main body portion of a configuration complementary to the outer periphery of the pole for facilitating securing of the eye thereto, and line receiving means having an elongated arcuate opening for passing the line therethrough in a manner for securing the line to the pole with a minimum of interference between the line and the pole.

1 Claim, 4 Drawing Figures

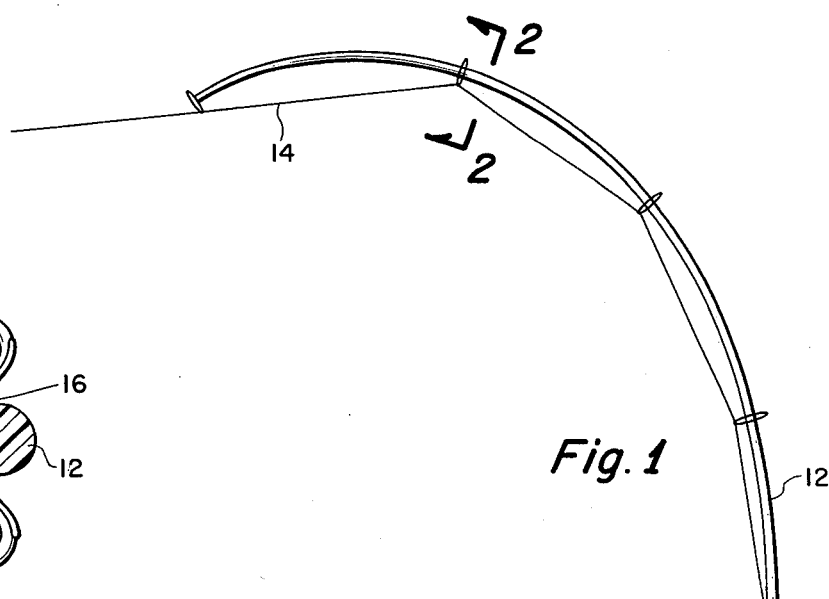
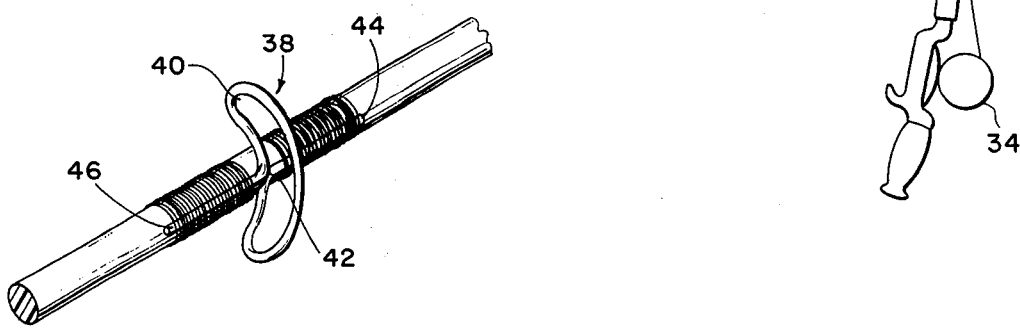
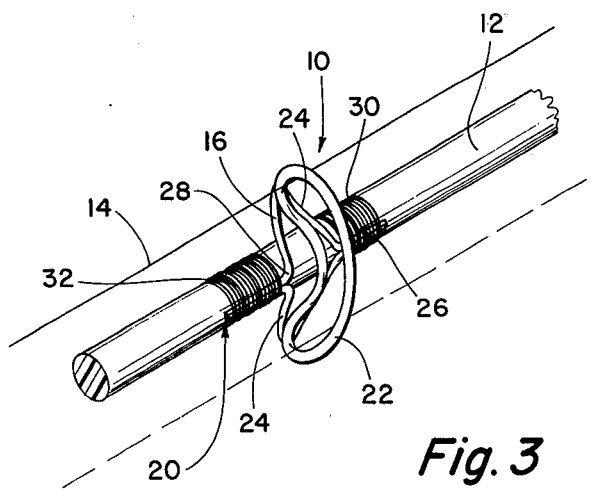
Fig. 1
Fig. 2
Fig. 4
Fig. 3

FISHING POLE EYE

BACKGROUND OF THE INVENTION

1. Field of the Invention

This invention relates to improvements in fishing devices and more particularly, but not by way of limitation, to an eye for attachment to a fishing pole for securing the fishing line to the pole.

2. Description of the Prior Art

The usual fishing pole is provided with a plurality of eye members spaced longitudinally along the pole for receiving the fishing line therethrough in order to secure the line to the pole from the fishing reel to the outer end of the pole. The normal eye in use today comprises a main body portion adapted to be attached or secured to the pole for supporting an opening in spaced relation to the pole whereby the line may be passed through the opening of each spaced eye from the fishing reel to the tip end of the pole. The portion of the fishing line extending between adjacent pairs of the eyes usually engages the outer periphery of the pole in two places. In addition, the line frequently crosses back and forth on the pole which causes a twisting action on the pole and produces undue drag and wear on the line as a fish is being reeled in.

SUMMARY OF THE INVENTION

The present invention contemplates a novel eye for a fishing pole particularly designed and constructed for overcoming the foregoing disadvantages. The novel eye element comprises a main body portion having an arcuate transverse configuration complementary to the outer circumference of the fishing pole for disposition thereagainst. In addition, a pair of oppositely disposed outwardly extending arm members are provided on the main body portion which lie against the pole adjacent the main body in order that suitable string or other tying material may be wound around the pole and arm members for securely retaining the eye element in position on the pole. An opening of an elongated arcuate configuration is carried by the main body portion and spaced slightly from the outer periphery of the pole for receiving the fishing line therethrough. The line receiving opening is sufficiently long for surrounding slightly more than one half the outer circumference of the fishing pole. This permits the line passing through the opening to seek the optimum position therefor with respect to the pole and directs the line in a manner wherein the only contact between the line and the fishing pole is at one point, that point being within the distance between the reel and the first eye. The novel fishing pole eye element is simple and efficient in operation and economical and durable in construction.

BRIEF DESCRIPTION OF THE DRAWINGS

FIG. 1 is a side elevational view of a fishing pole having fishing eye element embodying the invention installed thereon.

FIG. 2 is an enlarged sectional view taken on line 2—2 of FIG. 1, with the fishing line being omitted for purposes of illustration.

FIG. 3 is a perspective view of a portion of a fishing pole having a fishing line eye embodying the invention secured thereon, with one position of the fishing line being shown in solid lines and another position thereof being shown in broken lines.

FIG. 4 is a view similar to FIG. 3 depicting a modified fishing eye element embodying the invention, with the fishing line being omitted for purposes of illustration.

DESCRIPTION OF THE PREFERRED EMBODIMENTS

Referring to the drawings in detail, and particularly FIGS. 2 and 3, reference character 10 generally indicates a fishing pole eye element adapted to be installed on a fishing rod 12 for receiving a fishing line 14 therethrough, as is well known. The eye element 10 comprises a main body or saddle portion 16 of an arcuate configuration complementary to the circumferential configuration of the outer periphery of the fishing pole 12, and is adapted for being positioned directly thereagainst, as clearly shown in the drawings. A pair of oppositely disposed attachment members 20 are integral with or suitably secured to the saddle member 16 and extend outwardly therefrom for disposition against the outer periphery of the pole 12. An arcuate eye or loop member 22 of a substantially kidney-shaped configuration is rigidly secured to the saddle member 16 in any well-known manner, such as by soldering, or the like, and extends radially outwardly therefrom for receiving the line 14 therethrough. As particularly shown in FIG. 2, the overall arcuate length of the interior of the arcuate eye or loop member 22 is slightly greater than the semi-circumferential length of the outer periphery of the pole 12 whereby the inner ends of the loop 22 extend around the outer periphery of the pole 12 through a slightly greater arc than half the circumference of the pole for a purpose as will be hereinafter set forth.

As shown in FIGS. 2 and 3, the saddle member 16 and attachment members 20 are assembled from a pair of substantially identical half sections, each comprising a half-loop 24 of arcuate "planar" configuration, and having outwardly extending arms 26 and 28 on the opposite sides thereof which form the attachments 20 when the two half sections are placed in abutting positions. The two half sections are soldered or otherwise rigidly secured together to form the saddle 16. It will be apparent, however, that the saddle 16 may be of a unitary construction, if desired.

In order to secure the eye element 10 to the outer periphery of the pole 12, the saddle 16 and attachment arms 26 and 28 may be disposed adjacent the outer periphery of the pole, with the arms 26 and 28 extending longitudinally therealong as particularly shown in FIG. 3. Suitable tying cord or tying means 30 and 32 may be wound tightly around the outer periphery of the pole adjacent the saddle 16 and over the arms 26 and 28, respectively, and as well known, for securing the elements 10 to the pole 12. It is preferable that a plurality of the eye elements 10 be provided in longitudinally spaced relation along the entire length of the pole 12 as shown in FIG. 1, whereby the line 14 may be passed through each of the loop members 22 in succession. It is also preferable that a plurality of sizes of the saddle members 16 be provided for the eye elements 10 whereby an element 10 having a saddle of a size corresponding to the tapering dimensions of the pole 12 may be placed at the proper positions therealong.

During the fishing operation, the line 14 is usually unreeled from the usual fishing reel 34 and the line 14 is pulled from the reel 34 through the loops 22. The pressure on the line causes the line 14 to tend to move into a position at one end of the inner portion of the loop 22 as shown in solid lines in FIG. 3, or to the other end of the inner portion of the loop 22 as shown in broken lines in FIG. 3, in accordance with the natural tendency of the line in response to the pressure thereon. As a result, there will normally be only one point of engagement of the line 14 with the pole 12 as shown at 36 in FIG. 1. thus greatly reducing wear of the line 14.

Referring now to FIG. 4, a modified eye element 38 is shown which comprises an elongated substantially kidney-shaped arcuate loop member 40 similar to the loop member 22. The opposite ends of the loop 40 are in engagement as shown at 42 to close the loop and terminate in opposite extending attachment arms 44 and 46 similar to the arms 26 and 28. The arcuate length of the loop 40 is substantially identical with the arcuate length of the loop 22 for the same purpose, and the arms 44 and 46 may be disposed against the outer periphery of the pole 12 in the same manner as hereinbefore set forth in connection with the arms 26 and 28 and secured thereto in the same manner. The line 14 is passed through the loops 40 spaced along the length of the pole 12 in the same manner as hereinbefore set forth, and the line is thus secured to the pole 12 in a manner for greatly reducing contact of the line with the pole 12.

From the foregoing, it will be apparent that the present invention provides a novel eye element for a fishing pole particularly designed and constructed for connecting a fish line with the pole in a manner for substantially eliminating any interference of the eye with the fishing pole and for maintaining a minimum contact of the line with the pole to reduce wear on the line and increase the useful life thereof. The eye element includes a saddle member having attachment arms for securing the element to the pole and an elongated arcuate loop member spaced from the outer periphery of the pole for receiving the line therethrough with the arcuate configuration of the loop member being particularly selected for permitting the pressure in the line to position the line in the most optimum position thereof with respect to the pole.

Whereas the present invention has been described in particular relation to the drawings attached hereto, it should be understood that other and further modifications, apart from those shown or suggested herein may be made within the spirit and scope of this invention.

What is claimed is:

1. An eye for a fishing pole having a fishing line and comprising attachment means engageable with the outer periphery of the pole for securing the eye thereto, and elongated arcuate loop means carried by the attachment means, said loop means including an arcuate opening of substantially constant width through the length thereof and having an internal length sufficiently long to surround slightly more than one half the circumferential distance around the outer periphery of the pole for receiving the fishing line therethrough, said attachment means comprising an open saddle member having an arcuate configuration complementary to the configuration of the outer periphery of the pole for engagement therewith, oppositely disposed outwardly extending arm members engageable with the outer periphery of the pole and extending longitudinally therealong, and winding means wound around the outer periphery of the pole and the arm members for securing the eye to the outer periphery of the pole, said saddle member including a pair of oppositely disposed substantially V-shaped elements, and said arm members each including a pair of abutting arm members each being integral with the respective V-shaped element.

* * * * *